United States Patent [19]

Opprecht

[11] Patent Number: 4,652,720
[45] Date of Patent: Mar. 24, 1987

[54] APPARATUS FOR THE SPOT WELDING OF COATED SHEET-METAL MEMBERS

[75] Inventor: Paul Opprecht, Bergdietikon, Switzerland

[73] Assignee: Elpatronic AG, Switzerland

[21] Appl. No.: 779,884

[22] Filed: Sep. 25, 1985

[30] Foreign Application Priority Data

Sep. 25, 1984 [CH] Switzerland .......................... 4583/84

[51] Int. Cl.⁴ ............................................. B23K 11/06
[52] U.S. Cl. .................................... 219/82; 219/86.1; 219/86.25; 219/86.7
[58] Field of Search ...................... 219/82, 86.1, 86.22, 219/86.33, 86.25, 86.7, 119

[56] References Cited

U.S. PATENT DOCUMENTS 2,040,877  5/1936  Quarnstrom ........................... 219/83

FOREIGN PATENT DOCUMENTS 1125866  3/1979  Canada ................................ 219/119
455966  10/1965  Switzerland ........................ 219/119

Primary Examiner—E. A. Goldberg
Assistant Examiner—Lincoln D. Donovan

[57] ABSTRACT

For the welding of tongues (12) onto rupturable can members (10) of tin plate, a pair of welding electrodes (20, 22) is provided which are movable cyclically towards and away from one another and are additionally movable cyclically transversely to this movement in such a manner that successive spot welds are carried out by different portions of electrode.

5 Claims, 4 Drawing Figures

APPARATUS FOR THE SPOT WELDING OF COATED SHEET-METAL MEMBERS

The invention relates to an apparatus for the spot welding of coated sheet-metal members, particularly for welding tongues onto rupturable can members of tin plate, with a pair of welding electrodes which are movable cyclically towards and away from one another.

The electrical resistance welding of coated sheet-metal members, particularly of tin plate, frequently involves difficulties because the coating tends to contaminate the welding electrodes and so to increase the resistance to the passage of current from these to the sheet-metal members, in consequence of which, sparks and splashes result and the strength of the weld is reduced.

During the continuous longitudinal seam welding of can bodies, it is known (DE-C No. 1 017 042) to pass an electrode wire through between two overlapping marginal regions of sheet-metal blanks rolled into a cylinder and each roller-shaped electrode support, on which electrode wire the electrode supports roll continuously.

So far as can be seen, the spot welding of coated sheet-metal members, particularly the welding of tongues onto rupturable can members of tin plate, has hitherto only been proposed in an earlier Application which is not a prior publication, without any details being given there about the design of the welding apparatus. Known apparatuses for spot welding are only suitable for the purpose indicated in the earlier Application to a limited extent because the electrodes have to be replaced after only a comparatively small number of spot welds.

It is therefore the object of the invention to construct an apparatus of the type described at the beginning in such a manner that it is capable of making a large number of spot welds in a short time without trouble.

According to the invention, the problem is solved in that the welding electrodes are additionally movable cyclically transversely to the direction of their movement towards and away from one another, in such a manner that successive spot welds are carried out by different portions of electrode.

The apparatus according to the invention may be developed so that a portion of an electrode wire, which can be moved on step by step, is disposed as a welding electrode between each of the sheet-metal members to be welded to one another and an associated push-rod-like electrode support.

In this case, the electrode wire may be taken successively over both electrode supports and through a cleaning device in between.

In another, particularly advantageous, form of embodiment of the invention, at least one of the welding electrodes has a substantially plane, annular end face for the welding and is rotatable step by step about an axis along which the two welding electrodes are movable towards and away from one another.

This form of embodiment is preferably further developed in that, associated with the or each rotatable welding electrode is a drive which turns it cyclically through an angle by which one complete revolution (360°) cannot be divided without a remainder. Thus the effect is achieved that the welding electrodes wear uniformly on their annular end faces and have a correspondingly long life.

Examples of embodiment of the invention are explained below, with further details, with reference to diagrammatic drawings. These show:

Figure 1:
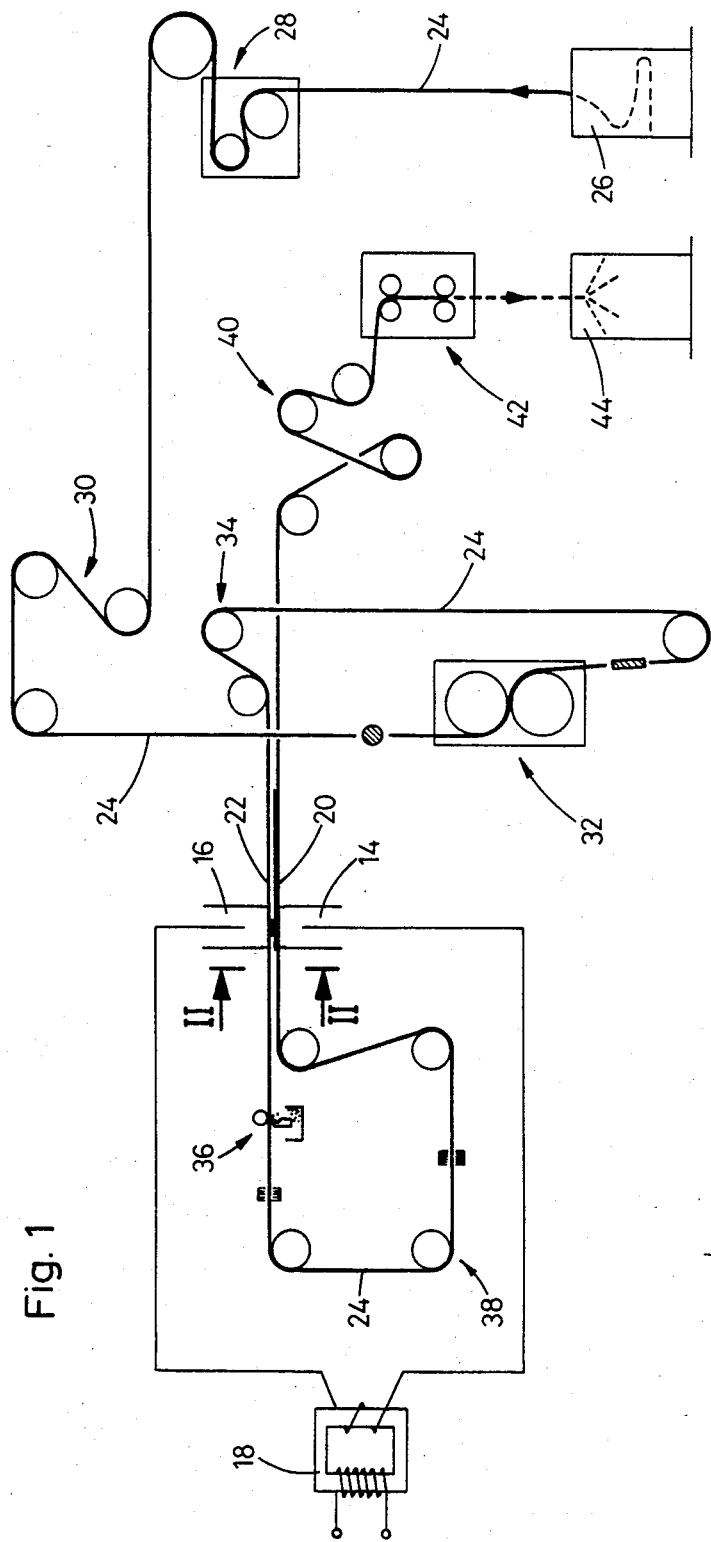
FIG. 1 shows a first welding apparatus with features of the invention.

The purpose of both the welding apparatuses illustrated is to weld onto each can member 10, particularly a plane blank of tin plate 0.2 mm thick for example, a tongue 12 which consists, for example of tin plate 0.4 mm thick and is provided to tear open the can formed from such a can member. In both examples of embodiment, a lower electrode support 14 is associated with the can member 10 and a plunger-like upper electrode support 16 is associated with the tongue 12, and a welding transformer 18 is provided, to the secondary circuit of which a lower welding electrode 20 and an upper welding electrode 22 are connected directly or indirectly.

Figure 2:
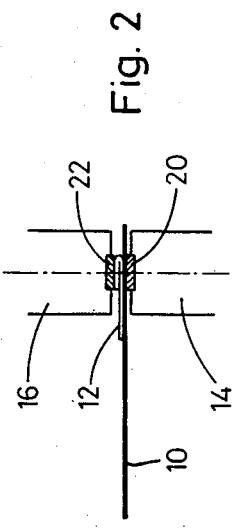
FIG. 2 shows the enlarged partial section II—II in FIG. 1.

In the apparatus illustrated in FIGS. 1 and 2, the two welding electrodes 20 and 22 are formed by portions of one and the same electrode wire 24 which is uncoiled from a barrel 26 and guided over a plurality of sets of rollers, namely a first set of rollers 28 which can be braked, a second set of driven rollers 30, a third set of rollers 32 which deforms the originally circular cross-section of the electrode wire 24 into a substantially rectangular cross-section, and a fourth set of rollers 34.

The electrode wire 24 is passed through, as an upper welding electrode 22, under a plane lower end face of the plunger-like upper electrode support 16. Then the electrode wire 24 is taken through a cleaning device 36 which strips adhering impurities, particularly tin, from it. Then the electrode wire 24 runs over a guide device 38 and subsequently, as a lower welding electrode 20, over a plane upper end face of the lower electrode support 14, which is fixed in position. Finally, the electrode wire 24 runs over a further set of rollers 40 into a chopping device 42 where it is chopped into small portions which fall into a container 44.

In the apparatus described above with reference to FIGS. 1 and 2, the consumption of electrode wire 24 can be kept extremely low because, after each spot weld, it only needs to be moved on by a distance which is considerably shorter than the dimension of the welding spot in the longitudinal direction of the electrode wire. In general, it is sufficient if the electrode wire 24 is moved on by a distance of the order of magnitude of 0.1 mm after each spot weld. For this purpose, a continuous pull can be exerted on the electrode wire 24 by one or more of the sets of rollers described; an intermittent forward movement of the electrode wire then results simply from the fact that it lengthens resiliently while its portions serving as welding electrodes 20 and 22 are clamped between the electrode supports 14 and 16 and the electrode wire then shortens again as soon as it released by the electrode supports.

In the apparatus illustrated in FIGS. 3 and 4, a lower electrode support 14, which cannot be displaced axially, is likewise disposed vertically below an upper electrode support 16 which can be moved up and down. Here, too, a welding transformer 18 supplies the welding current which may be of the order of magnitude of 4000A for example. Secured to each of the two electrode supports 14 and 16 is a disc-shaped welding electrode 20 or 22 which has an annular end face 46 or 48. The two electrode supports 14 and 16 as well as the disc-shaped welding electrodes 20 and 22 have a common vertical axis A and are mounted in a frame 50 in such a manner that they are rotatable about this axis.

The upper electrode support 16 is biased upwards by a compression spring 52 with a force of the order of magnitude of about 400 N and can be pressed downwards by means of a hydraulically actuated ram 54, against the force of this spring. Associated with each of the two electrode supports 14 and 16 is a drive 46 or 48 for rotary movements of the order of magnitude of about 1° taking place step by step. The magnitude of the rotary movements is selected so that different portions of the welding electrodes 20 and 22 are situated below the ram 54 during successive revolutions. A hydraulically actuated clamping device 60 is provided for periodically stopping of the lower welding electrode 20; the upper welding electrode 22 is periodically stopped by the ram 54.

Figure 3:
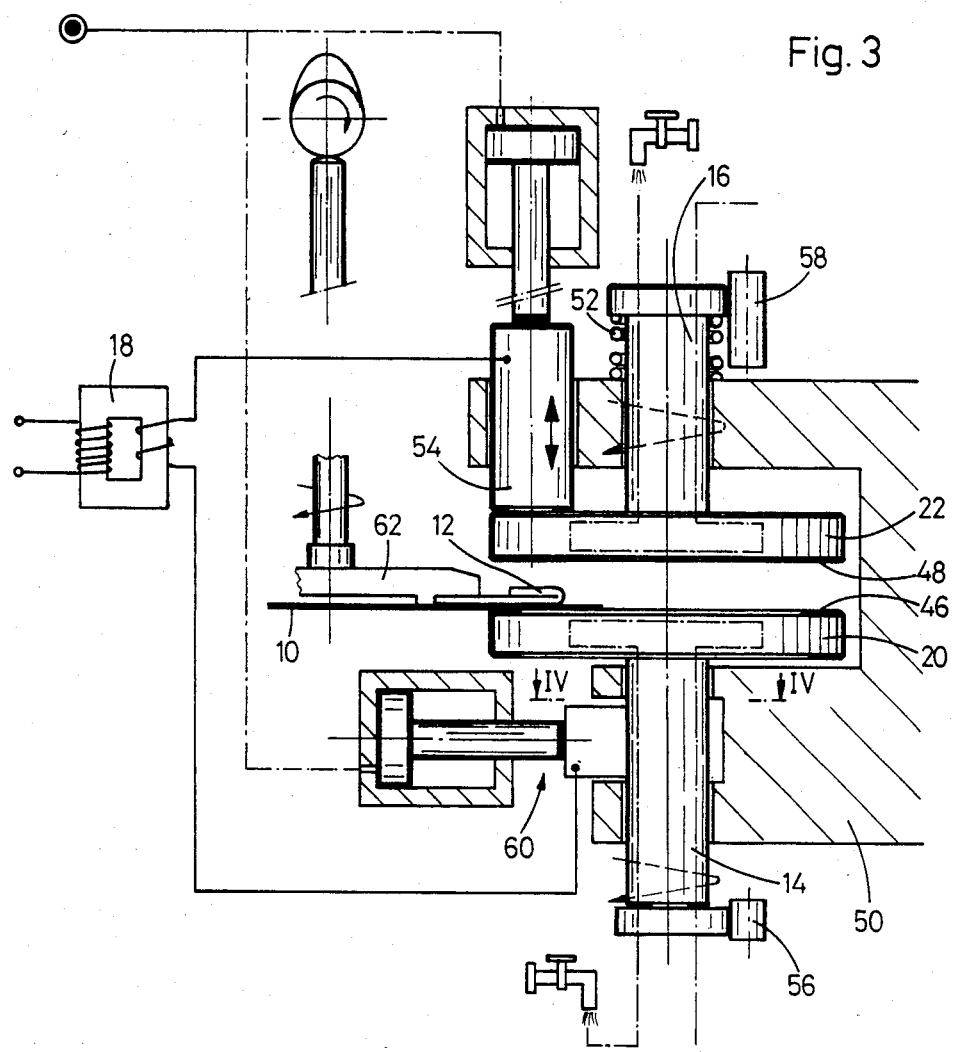
FIG. 3 shows a second welding apparatus with features of the invention.
Figure 4:
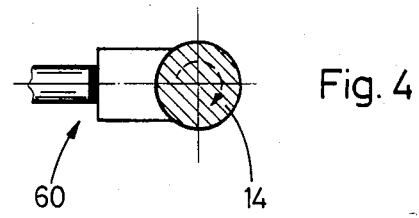
FIG. 4 shows the partial section IV—IV in FIG. 3.

It applies both to the apparatus illustrated in FIGS. 1 and 2 on the one hand and to that illustrated in FIGS. 3 and 4 on the other hand, that after each upward movement of the upper electrode support 16, a can member 10 and a tongue 12 are inserted between the two welding electrodes 20 and 22; a magnetic gripper 62, which is rotatable cyclically about a vertical axis, may be provided for the insertion and precise positioning of the tongue 12, as shown in FIG. 3.

A mechanical drive, for example a cam-controlled drive, may be provided instead of a hydraulic drive for the upward and downward movements of the upper electrode support 16 (or selectively of the lower electrode support 14), as is indicated in FIG. 3.

I claim:

1. An apparatus for the spot welding of coated sheet-metal members, particularly for welding tongues (12) onto openable can members (10) formed from tin plate, with a pair of welding electrodes (20,22) including means for moving the electrodes cyclically toward and away from one another with the coated sheet-metal members therebetween to form spot welds in the coated members and to release the members for movement between the formation of each successive spot weld. characterised by means for cyclically moving the welding electrodes (20,22) transversely to the direction of their movement towards and away from one another during the intervals in which the welding electrodes are moved away from one another such that successive spot welds are carried out by different electrode portions.

2. An apparatus as claimed in claim 1, characterised in that a portion of an electrode wire (24), which can be moved on step by step, is disposed as a welding electrode (20 and 22 respectively) between each of the sheet-metal members (10, 12) to be welded to one another and an associated push-rod-like electrode support (14 and 16 respectively).

3. An apparatus as claimed in claim 2, characterised in that the electrode wire (24) is guided successively over both electrode supports (14, 16) and through a cleaning device (36) in between.

4. An apparatus as claimed in claim 1, characterised in that at least one of the welding electrodes (20, 22) has a substantially planar, annular end face (46 or 48) for the welding and is rotatable step by step about an axis (A) along which the two welding electrodes (20, 22) are movable towards and away from one another.

5. An apparatus as claimed in claim 4, characterised in that associated with the or each rotatable welding electrode (20,22) is a drive (54 and 56 respectively) which turns the electrode periodically through an angle which does not divide evenly into 360°.

* * * * *